Jan. 18, 1944.     F. S. SMITH     2,339,734
APPARATUS FOR STERILIZING FLOUR AND THE LIKE
Filed Jan. 3, 1941     3 Sheets-Sheet 2

INVENTOR
FRANKLIN S. SMITH
BY William T. Kuesmer
ATTORNEY

Jan. 18, 1944.   F. S. SMITH   2,339,734
APPARATUS FOR STERILIZING FLOUR AND THE LIKE
Filed Jan. 3, 1941   3 Sheets-Sheet 3

INVENTOR.
FRANKLIN S. SMITH
BY William T. Kuesner
ATTORNEY

Patented Jan. 18, 1944

2,339,734

UNITED STATES PATENT OFFICE 2,339,734

APPARATUS FOR STERILIZING FLOUR AND THE LIKE

Franklin S. Smith, Bethany, Conn.

Application January 3, 1941, Serial No. 372,954

11 Claims. (Cl. 21—61)

This invention relates to a method and apparatus for sterilizing milled and other products in bulk.

One of the objects of this invention is to provide an improved method and apparatus for treating products of the above-mentioned nature, particularly for the purpose of destroying the life of insect infestation contained therein and which may be present therein in various of its stages, such as in the form of eggs, larvae, pupae, or adults. In my co-pending applications Serial Nos. 296,543, 296,544, 321,680 and 345,715, I have disclosed various forms of apparatus suitable for destroying the life of insect infestation in products of the above-mentioned nature, such apparatus utilizing rotary product-treating units which effect movement therethrough of the particles of the product and of the forms of insect life under the action of centrifugal forces set up by the particles and the infestation, the treating units being capable of various embodiments, such as those illustrated in the aforesaid applications, to effect coactions which include a life-destroying mutilation of the forms of insect life. Usually the operation of these treating units is accompanied by a discharge, with the treated product, usually peripherally and tangentially, of quantities of air, the unit acting in a general sense somewhat like a centrifugal air pump or impeller and under various circumstances such as the character of the product being treated, the character of the installation of the apparatus, and the like, the resultant flow of air or the resultant building up of an air pressure at the discharge end of the apparatus is objectionable. In such apparatus, also, it is possible to have the treated product discharged peripherally and tangentially from the rotary treating unit at such velocities that its impact with, for example, the inner or bounding walls of the enclosing casing, effects a further breaking up of the particles of the product and with some products such a further "milling" is undesirable. One of the dominant aims of this invention is to provide an apparatus of the just described character that will in a simple, practical, inexpensive and efficient way avoid the building up of undesirable air pressures. Another dominant aim of this invention is to provide an apparatus of the above-mentioned nature with simple, reliable and inexpensive means for lessening the further breaking up or milling of particles of the treated product.

Another object is to provide a method and apparatus for the treatment of products of the above-mentioned nature and in which control of impelled air is effected in a simple and reliable manner to avoid or minimize the above-mentioned objectionable effect. Another object is to provide a product-treating apparatus of the above-mentioned nature with means utilizing the rotational effect of the rotary treating unit to control the effect of the current of air set in motion by the rotating treating unit itself. Another object is to provide an apparatus of the kind described in the above-mentioned applications and capable of being incorporated into usual or existing mill equipment that will be capable of effecting efficient treatment of the product and passing the treated product on to the next step or apparatus in the mill equipment without carrying with the product thus passed on an objectionable or undesired volume or velocity of air flow.

Another object is to provide a simple and practical method and apparatus for treatment of products of the above-mentioned nature without further breaking up or milling of the product particles upon their discharge from the rotary treating unit. Another object is to provide an apparatus of the kind described in the above-mentioned applications with simple, practical and dependable means for preventing the product particles discharged by the rotary treating unit from being further broken up or milled. Another object is to provide a method and apparatus for cushioning or negativing the effects of impacts of product particles discharged from the rotary treatment unit toward or against the internal casing walls. Another object is to provide simple, practical and reliable means for deflecting or guiding, toward the discharge outlet of the apparatus, product particles discharged at relatively high velocity from the rotary treatment unit, but without further breaking them up.

Another object is in general to provide product-treating apparatus of the above-mentioned character that will be of improved action, of greater efficiency, and capable of handling a wider range of products for treatment. Other objects will be in part obvious or in part pointed out hereinafter.

The invention accordingly consists in the features of construction, combination of elements, arrangements of parts, and in the several steps and relation and order of each of the same to one or more of the others, all as will be illustratively described herein, and the scope of the application of which will be indicated in the following claims.

In the accompanying drawings in which is shown one of the various possible embodiments of the mechanical features of my invention.

Similar reference characters refer to similar parts throughout the several views in the drawings.

Of the various structural forms of rotary product-treating unit disclosed in my above-mentioned applications and to all of which the features of my present invention are applicable, I have selected for purposes of illustrating such applicability a rotary product-treating unit of the general type or kind disclosed in my application Serial No. 321,680, but in structurally improved form to achieve such further objects and advantages as greater simplicity and lower cost of manufacture; in the drawings this rotary treating unit is generally indicated by the reference character 10 and like the units of my aforesaid applications it comprises a plurality of elements providing therebetween treatment spaces, being preferably carried by or assembled to a plate-like carrier member 11 (Figures 1 and 2) illustratively substantially frusto-conical, being preferably relatively heavy or strong and being suitably formed at its center to provide a hub 11ª by which it is fitted to and coaxially secured to a shaft 12 having a tapered portion 12ª with which a correspondingly tapered bore of the hub 11ª interfits.

Any suitable means may be employed to secure the carrier member 11 to the shaft 12, preferably in a manner to permit ease of disassembly, as by the means generally indicated at 13 and which may comprise a sleeve threaded onto a threaded extension of the shaft 12 and constructed, as described in, for example, application Serial No. 321,680, to coact with the carrier member 11 to clamp it onto the shaft or to pull it off for disassembly.

It is preferably by way of shaft 12 that the treating unit 10 is supported for rotation and is driven at a suitable speed. Shaft 12 is suitably supported for rotation within a casing-like structure generally indicated by the reference character 15 and preferably comprising several sections, such as the lower section 16 and the upper section 17 suitably secured together preferably detachably.

Upper section 17 is provided with an inlet passage 18 formed by a cylindrical flange 19 which extends both externally and internally and to the external portion of the flange 19 may be connected a tubular conduit 20 preferably made of a suitable flexible material like fabric or cloth, thus to connect the apparatus usually to the discharge end of a machine or apparatus forming part of the usual production equipment employed in the milling of the products to be treated. Lower casing section 16 is provided with an outlet passage 21 flanged as at 22 to have connected to it a conduit 23 usually of flexible material, to discharge the now sterilized or treated product from the apparatus and pass it on to the next machine or apparatus, such as a bagging or packaging apparatus usually forming part of the above-mentioned production or routine equipment.

Figure 1:
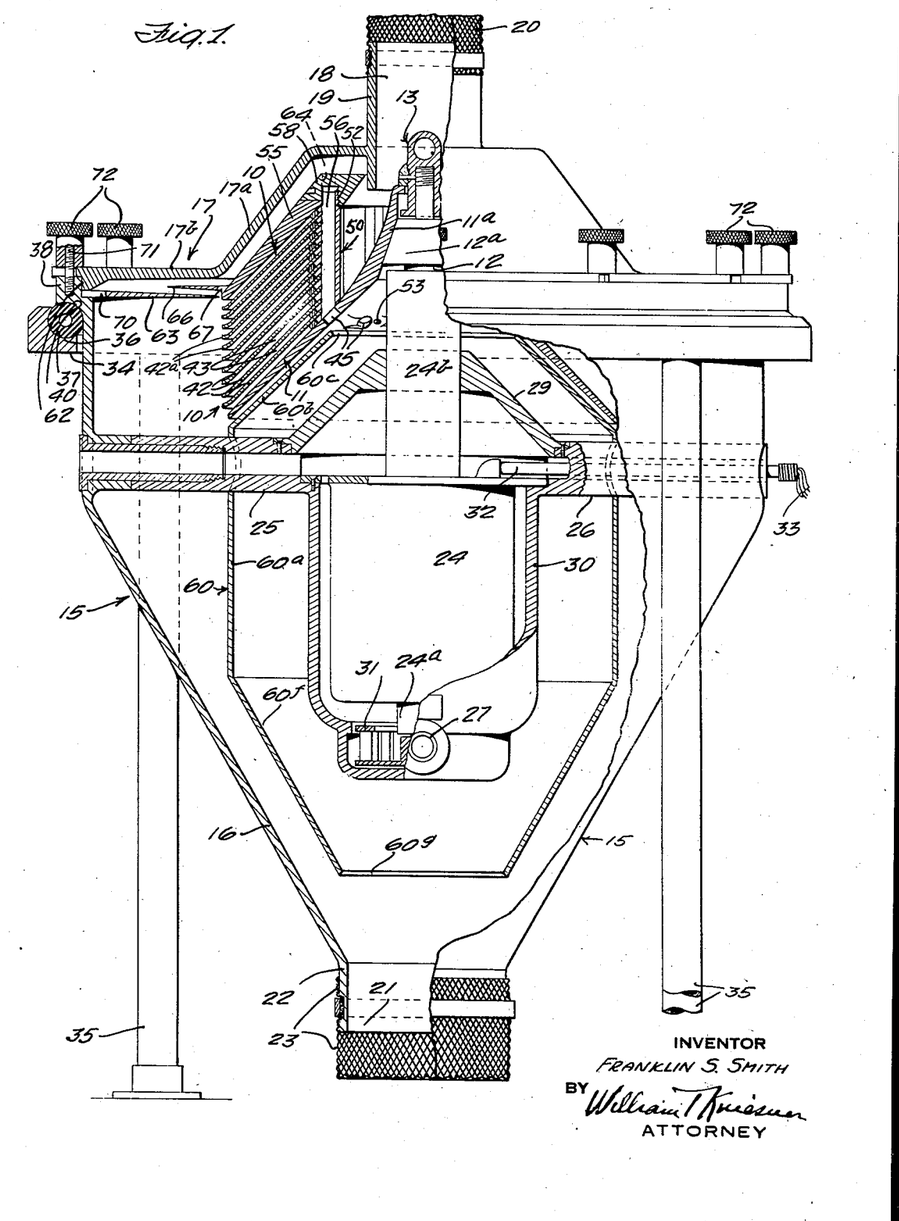
Figure 1 is a front elevation of the apparatus with certain parts broken away and with certain other parts shown in central vertical section.

Where, as in the preferred and illustrative case, it is desired to drive the treating unit 10 electrically, the shaft 12 may and preferably does comprise the shaft of an electric motor, such as a polyphase alternating current induction motor, of which the casing is indicated at 24 in Figure 1; the casing is provided in any suitable way with suitable bearings, such as combined radial and thrust anti-friction bearings, preferably mounted in extensions 24ª and 24ᵇ of the casing 24.

In the preferred arrangement the motor frame 24 is preferably rigidly mounted within the casing structure 15 in any suitable way and where the motor is of the enclosed fan cooled type the mounting means for the motor may form part of the air cooling system of the motor, as described in detail in my application Serial No. 296,544; it is this form of motor and mounting that I have selected for illustration in this application and for present purposes it is sufficient to note that the motor casing 24 is rigidly secured to casing section 16 by two diametrically opposed bracket structures 25, 26 adjacent the upper end of the motor casing and two diametrically opposed and alined bracket structures 27 at the lower end of the motor casing. The two pairs of brackets 25—26 and 27 extend along diameters at say 90° to each other and these brackets may be secured to or be formed integrally with an outer jacket or casing 30 surrounding the motor casing 24, and with the brackets hollow or tubular the latter thus form connections to the jacket from the outside of the apparatus casing 15. Thus, bracket 25 may serve as an inlet for air which is drawn into the space between motor casing 24 and jacket 30 by any suitable means such as an air impeller 31 accommodated in the lower portion of the jacket structure and secured to and driven by the lower end of shaft 12, tubular bracket 27 serving as outlets for the discharge of the air which absorbs the heat losses in the motor dissipated through the motor casing 24. One of the brackets, such as bracket 26, may serve for the passage of a wiring conduit 32 to extend the motor circuit conductors 33 to the motor.

A frusto-conical member 29 is interfitted at its lower and outer end with the upper end of the jacket 30 and at its upper and inner end is interfitted with the bearing extension 24ᵇ, thus forming a strong brace to transmit to the casing structure 15 strains or thrusts which the shaft 12 might exert radially.

The rotating parts are preferably constructed and assembled or otherwise dynamically balanced, and preferably provision is made for preventing overstressing of parts or causing unsafe vibration or other undesirable defects due to the occurrence of any condition of unbalance arising during the operation of the treating unit. Where the supporting and driving shaft 12 is rigidly mounted from the casing structure 15, as by the motor and bracket construction illustratively set forth above, I preferably support the casing structure so that it and the internally supported rotating parts may precess when a condition of unbalance arises. An illustrative support for such purpose may comprise a ring-like frame member 34 suitably supported as by a suitable number of standards 35 which may be secured to the floor, frame member 34 being provided with a continuous peripheral concave seat 36 in which rests a resilient or cushioning member 37 preferably of rubber and preferably in tubular form, being sufficiently thick-walled and of a quality to give the desired resiliency of action and to carry the load without permanent deformation. The upper peripheral portion of the lower casing section 16 is provided with an outwardly directed peripheral flange 38 having a downwardly facing concave peripheral seat 40 to take the cushioning member 37, which thus becomes interposed throughout its peripheral extent between the main supporting frame 34 and the casing structure.

The product to be treated enters the apparatus through the inlet passage 18 and is fed to the entry end of the treating unit 10 into and through the spaces in which the particles of the product with the insect infestation pass under the action of the centrifugal forces set up in them by the rapid rotational movement given them by the rotating treating unit 10; in the latter the life in the forms of insect infestation is destroyed by actions such as those described in my above-mentioned applications. The sterilized product is discharged in a general tangential direction from the peripheral or outlet ends of the spaces in the treating unit 10, whence the product is guided by the lower frusto-conical walls of the casing section 16 to the outlet passage 21. A typical or illustrative speed of drive of the treating unit 10, where the latter has a diameter at the inlet openings to the spaces on the order of 10" and a diameter at the outlet ends of the spaces on the order of 18", is 3450 R. P. M., suitable for causing the forms of insect life to exert centrifugal forces to effect a life-destroying mutilation thereof in coaction with the surfaces of the spaces formed in the treating unit 10. But as earlier above noted, the treating unit 10 can set up a movement of air through its space or spaces and act like an air impeller, apparently operating upon particles or molecules of air much in the same general way as it operates upon particles of the product to effect flow or movement therethrough. Thus, the treating unit 10 can be effective to set up in the casing structure 15 a pressure or head of air which effects a movement of air through the outlet passage 21 in an amount or at a rate greater than the normal air entrained by the product itself and, depending upon various factors, such as the character of the apparatus connected to the conduit 23, this excessive air flow is undesirable or objectionable.

In such case, I provide for lessening or avoiding such undesirable effects. Where the treatment unit is constructed to have a lower carrier element like the member 11, extending from its periphery to the shaft 12, the member 11, though rotating, forms in effect an unbroken barrier between an upper portion or zone of the interior of the casing and a lower portion or zone, the elements of the treating unit 10, supported by or related to the upper face of the member 11, being in effect in this upper zone and the inlet passage 18 feeding the product to be treated to the treating unit 10 in this upper zone. The above-mentioned air impeller action of the treating unit 10 is thus to move air, drawn in through the inlet passage 18, from this upper zone and into the lower zone. Illustratively, the elements of the treating unit 10 may comprise a plurality of frusto-conical elements 42 suitably held in spaced relation to form spaces 43 therebetween of a thickness on the order of $\frac{1}{16}$". In much the same way that the product particles are passed through the spaces 43 by the centrifugal forces set up in them, air is impelled therethrough and discharged peripherally, to enter the lower zone.

To counteract or negative the effect of a resultant pressure head in passing air on through the outlet passage 21, and also the effect, which likewise may be undesirable or objectionable in drawing more air downwardly through the inlet passage 18 than is normally entrained with the product, I arrange to feed back to the entry ends of the space or spaces in the treating unit 10 a substantial portion of the air discharged into the lower zone by the impeller action of the treating unit. This I achieve preferably by several coacting features of construction and action.

Illustratively, I provide at the under side of the carrier element 11, that is, the side exposed toward the lower zone, means for taking up air from the lower zone and discharging it into the upper zone and preferably directly into the inlet ends of the spaces 43 of the treating unit. Such a means may be embodied directly into the carrier member 11 and in the drawings it is illustratively so shown. Thus, where the member 11 is made of substantial thickness, say on the order of $\frac{1}{2}$", I provide a series of apertures 45 arranged preferably in a circle of a diameter on the order of the diameter of the treatment unit 10 at the inlet openings to the spaces 43 thereof. Illustratively, these apertures may be illustratively eight in number and the under face of the carrier member 11 at the leading side of each aperture 45 is shaped as by milling to form with the thereby exposed and trailing wall of the aperture a bucket-like recess generally indicated by the reference character 46 and better shown on enlarged scale in Figures 4 and 5, in both of which the arrow indicates the direction of rotation of the carrier member 11.

Figure 4:
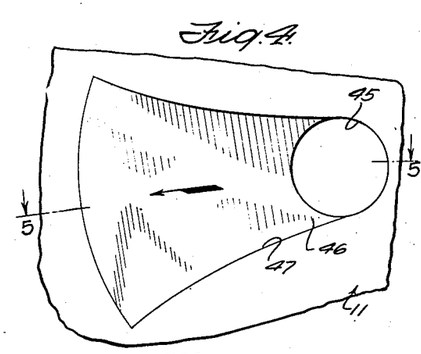
Figure 4 is a fragmentary bottom view on a greatly enlarged scale of an air-impeller element that coacts with the treating unit.
Figure 5:
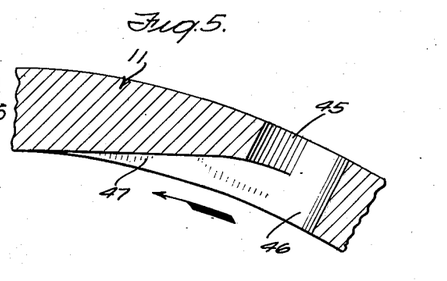
Figure 5 is a sectional view as seen along the line 5—5 of Figure 4.

Thus, each aperture 45 may be formed as by milling and in Figures 4 and 5 is indicated at 47 the above-mentioned milled-out or cut away portion of the member 11. The cut away portion will be seen to be of gradually increasing depth and of gradually diminishing width in the direction from the leading toward the trailing end thereof, thus forming an air scoop or air bucket. With a suitable number of such buckets, suitably dimensioned with respect to the radius of the circle about which they are uniformly distributed and with respect to the speed of rotation, the construction can be given an air-impelling capacity of any desired ratio to the air-impelling capacity of the treating unit 10 itself. Preferably, and illustratively, this ratio may be on the order of 8 to 10. Thus, the impeller structure 45—46 may be made to transfer from the lower zone to the upper zone and through the diaphragm-like or dividing carrier member 11 about 80% of the air discharged into the lower zone.

Preferably, the air thus transferred to the upper zone is guided for discharge directly into the inlet ends of the treatment spaces 43 and here I may employ a member in the form of a cylindrical annulus, generally indicated by the reference character 50 and preferably constructed also to effect appropriate distribution of infed product particles to the various treatment spaces. In construction, it comprises a plurality of upstanding elements 51, illustratively eight in number, and shaped as is better shown in Figure 3, being uniformly spaced about a circle and having their lower faces shaped to fall in a frustoconical plane to mate with and rest against a corresponding frusto-conical band-like portion of the upper surface of the carrier member 11 and in which band-like portion the apertures 45 terminate, as is better shown in Figure 2. Thereby, the member 50 may be coaxially alined with the carrier member 11 to which it may be secured as by screws 53 (Figures 1 and 2) passing through the member 11 and threaded respectively into the members 51.

At their upper ends the members 51 are joined together by an inner annular portion 52 (Figure 2), the latter being threaded as shown. Elements 51 and 52 are preferably integrally formed.

Figure 2:
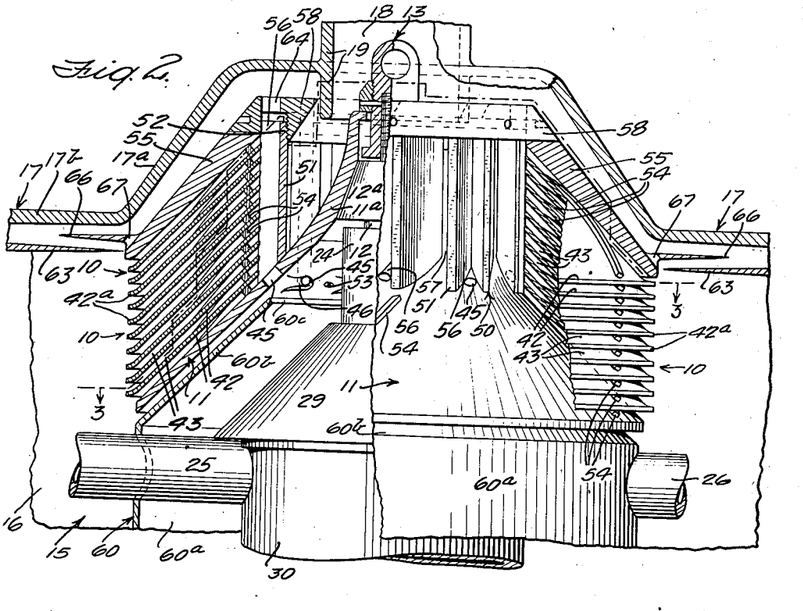
Figure 2 is a fragmentary view on an enlarged scale of part of the apparatus of Figure 1, with certain parts shown in vertical section and certain other parts broken away or omitted to show certain other parts in elevation.
Figure 3:
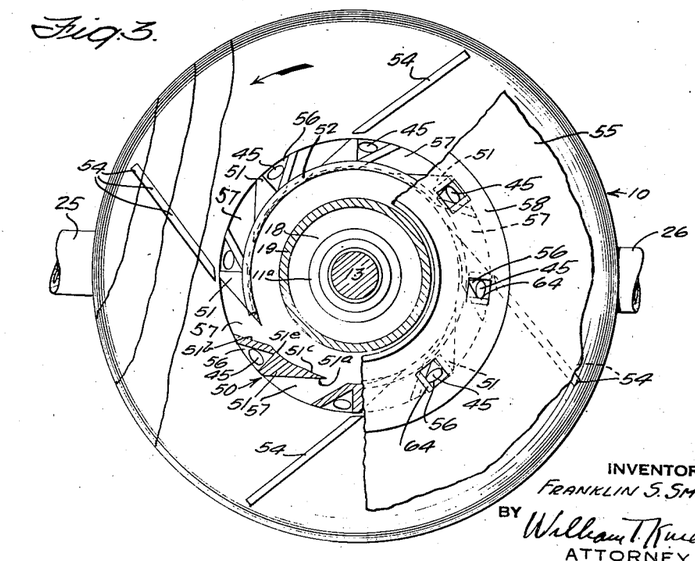
Figure 3 is a horizontal sectional view of the apparatus as seen along the line 3—3 of Figure 2.

The outer vertical faces of the members 51 fall in a cylinder of a diameter equal to the smaller diameter of the frusto-conical plate-like members 42 of the treating unit, whereby the latter are concentrically alined with each other and with the carrier member 11, being held in spaced relation from each other and from the carrier member 11 by uniformly distributed rib-like elements 54, illustratively four for each of these members, formed in or secured to the upper faces thereof and angularly arranged on each, as is better shown in Figure 3. Thus, four such rib elements 54 may be provided on the carrier member 11 and upon each member 42, and as the latter are assembled to the carrier member 11, as by slipping them over the member 50, the rib elements 54 of the various members are brought into vertical alinement, as appears better in Figures 2 and 3. Over the uppermost of the member 42 and resting upon the ribs 54 thereof is a frusto-conical clamping member 55 of suitably heavy construction for clamping, in a preferred manner later described, the stacked, spaced members 42 between itself and the carrier member 11. With such a construction, also, the members 42 may be made of sheet metal and in such case they are preferably flared out or given a curved flange at their peripheries, as indicated at 42a in Figure 1, thereby to stiffen each member 42 to hold it in its frusto-conical shape.

Extending vertically in the outer face of each member 51 is a V-shaped groove or channel 56 of substantial cross-section, a cross-section related to the direction of rotation of the treating unit in the manner indicated in Figure 3 where the unit is to rotate in counterclockwise direction. The lower portion of the channel 56 overlies an air discharge aperture 45 and the members 51, each with a channel 56, correspond in number to the number of apertures 45 so that the air impelled through the latter is guided upwardly by the channels 56. Laterally or outwardly, however, the channels 56 are open and face corresponding circumferential portions of the annular entry ends of the treatment spaces 43, thus to permit the direct discharge of air from the channels 56 into the treatment spaces. Such discharge is, moreover, aided by the suction-like effect produced in the treatment spaces themselves and also by the angularity of the walls of the V-shaped channels 56 (see Figure 3) relative to the direction of rotation. With air thus forced from the lower zone and fed into the inlet ends of the treatment spaces, thus for virtually continuous recirculation, a substantial portion of the air-impelling capacity of the treating unit is utilized in taking part in such recirculation, the remainder being suitable to handle the air entrained with the product that enters the apparatus through the inlet passage 18.

As is better shown in Figure 3, the spacing between the vertical elements 51 form passages 57 connecting the annular space about the central hub portion of the carrier member 11 and to which space incoming product is discharged for distribution among the treatment spaces 43, to the latter, and it is through the passages 57 that the product to be treated with its entrained air passes into the treatment spaces.

The product particles dropping downwardly through the inlet passage 18 are set into rotary movement by the frusto-conical hub-like central portions of the carrier member 11 and, aided by the peripheral velocities of points on the surfaces of the latter, increasing with the radius, exert centrifugal forces which cause them to move into the entry or inlet ends of the treatment spaces 43, accompanied by whatever forms of insect life may be in the product. The vertical elements 51, moving in counterclockwise direction, as viewed in Figure 3, move at substantial peripheral velocities, and the inner edge portions of the leading faces 51a thereof in effect pick up or catch up, in rapid succession, from the abovementioned outwardly moving product in the torous-shaped space about the hub-like central portions of the carrier member 11, relatively small quantities or increments of the infested product, and though there may be a non-uniform distribution, more or less, of the product in the torous-shaped space, the equally spaced elements 51, by an action like that just described, effect a substantially uniform distribution of moving flour particles and insect infestation into and throughout the entry ends of the treatment spaces 43, as are exposed to the passages 57, and effect also a regulating or limiting action upon the quantity of product supplied to the treatment spaces. These impeller-like actions upon the particles of the product may be aided by a similar impeller action upon air entrained in or with the product entering the apparatus through the inlet passage 18.

The trailing faces 51b of the elements 51 slant at an angle, as indicated in Figure 3, away from the direction of rotation, and at such an angularity that particles of the product will not adhere to or pack onto these surfaces. The inner faces of the members 51 are preferably broken into two surfaces, such as a cylindrical surface 51c of relatively small peripheral extent and coaxial with the axis of the member 50, thus to facilitate centering for machining or finishing of the member 50, and a surface 51e which may be arcuate but which slants away from the direction of rotation appropriately so that particles of the product will not adhere to or pack up onto it.

The annulus 50 which, as above described, serves in this form of construction to axially aline the elements or members 42 of the treating unit, preferably also serves to carry suitable means to press the clamping member 55 against the stacked elements 42 and toward the carrier member 11, and such means preferably comprises a ring member 58 of U-shaped cross-section, as shown in Figures 1 and 2, its outer annular portion being internally machined to substantially the radius of curvature of the outer faces of the members 51, thus to center the ring 58 with the member 50, and its inner annular portion is threaded for preferably loose threaded connection with the threaded annular portion 52 (Figure 2) of the annulus 50. Thereby the ring member 58, provided with externally exposed openings to take a suitable tool, like a spanner wrench, may be turned to effect a tight securing of the members 42 and the upper or clamping member 55, to the carrier member 11, the outer under part of the ring member 58 and the upper end part of the clamping member 55 being suitably shaped to provide mating seats through which the clamping pressure of the ring member 58 is transmitted to the clamping member 55 and thus a secure clamping of the stacked members 42, with the rib members 54 (Figures 2 and 3) in vertical alinement between the members 55 and 11, is effected.

With the particles of the product and the forms of insect infestation entering the treatment spaces 43, they are moved, due to the centrifugal forces they exert, against the under faces of the members 42 and 55, the movement being outwardly and downwardly in expanding curvilinear paths about the axis of rotation of the treating unit. Should any particle of product, insect infestation, or the like, detach itself for some reason from the material progressing along any such surface, the juxtaposed surface of the treatment space, rotating as part of the unit, catches such detached particles or otherwise sets them into motion at high velocity, thus to cause them to exert a sufficient centrifugal force to move them outwardly and again against the surface from which the detachment has taken place. The parts are dimensioned and the speed of drive selected so that the movement communicated to the forms of insect infestation along any of the above-mentioned under surfaces, in a curved path of increasing radius, is at such high velocity that the centrifugal force exerted by the form of insect life presses it against the surface at a pressure that effects a life-destroying mutilation, crushing or deformation. Illustratively, the angle of inclination of the frusto-conical surfaces relative to the axis of rotation may be on the order of 45° and with minmimu and maximum diameters on the order of 10" and 18", respectively, the speed of drive may be on the order of 3450 R. P. M., to effect dependable life-destroying action.

The product particles and the forms of insect infestation now devoid of life, due to the rubbing, abrading or crushing action, discharge peripherally in a tangential direction from the outlet ends of the treatment spaces 43. Should a form of insect life, in its curvilinear path of movement not be discharged from a treatment space before it encounters a rib element 54 (see Figure 3), the leading face of the rib element, slanting away from the direction of rotation, in effect strikes the form of insect life or the latter is impacted against it, with a force also effecting a life-destroying mutilation, crushing or deformation. The face of such a rib may also act as a surface along which, in an outward direction, the form of insect life is pressed and as the latter progresses along it, for ultimate discharge from the treating unit, is moved with a mutilating, crushing, or deforming action, resulting from the rubbing or abrading of the form of insect life as it moves therealong, thus also effecting destruction of its life.

Discharging from the treating unit, the sterilized product is guided by the inclined, preferably frusto-conical, walls of the lower casing section 16 to the outlet passage 21 through which it passes on, for example, to a bagging or packaging means, but in view of the continued circulation of a certain quantity of air, preferably on the order of 80% of the air impelling capacity of the treating unit, effected as above described, only the desired and relatively small quantity of air passes out of the apparatus with the treated product. These and the above described actions are preferably aided by a guide and partition generally indicated by the reference character 60 (see Figure 1) and preferably in the form of a sleeve of circular cross-section, being arranged preferably coaxially with the vertical axis of the apparatus. This sleeve-like guide 60 has an intermediate generally cylindrical portion 60ᵃ of a diameter about the same as the outside diameter of the rotary treating unit 10 and it has an upper portion 60ᵇ, substantially frusto-conical, fitting rather closely underneath the carrier member 11 and terminating with its upper peripheral edge forming a mouth 60ᶜ just about encompassing the circularly arranged air impeller buckets 46—47; it has a lower portion 60ᶠ substantially frusto-conical, the included angle being preferably equal to the included angle of the frusto-conical casing section 16, terminating at its lower edge in a mouth 60ᵍ of substantial diameter and, as shown in Figure 1, spaced substantially above the discharge passage 21.

The guide member 60 may be constructed in sections (not shown) to facilitate assembly and fastening to the pairs of supporting brackets 25—26 and 27, and, with the smaller-dimensioned motor and housing structure within it, thus forms an annular channel or passageway for movement of air upwardly, to the impeller buckets 46—47.

Adjacent the lower end of the apparatus, the air passages are preferably of relatively large cross-section to achieve relatively low air velocities; thus, with the particles of the treated product and air moving downwardly in the annular space between the casing section 16 and the portions 60ᵃ and 60ᶠ of the guide member 60, a substantial portion of that downwardly moving air is drawn upwardly through the lower mouth 60ᵍ of the guide member 60, and the latter is preferably relatively large so that the velocity of the air drawn upwardly through it is relatively low in order to avoid carrying a substantial amount of product with it, particularly where the product particles are fine, as with products like flour. At or in the region adjacent the lower mouth 60ᵍ, therefore, separation of the particles from the recirculating air stream takes place, the particles dropping or passing out of the apparatus through the discharge passage 21 and the portion of the air being recirculated passing upwardly through the mouth 60ᵍ, whence it is guided to the intake apertures 45 or to the impeller buckets 46—47 and thus fed to the inlet ends of the treatment spaces. This separating action is probably aided also by the reversal of direction of air flow as the air enters the mouth 60ᵍ, the inertia of the particles resisting such change in direction of movement.

Figure 10:
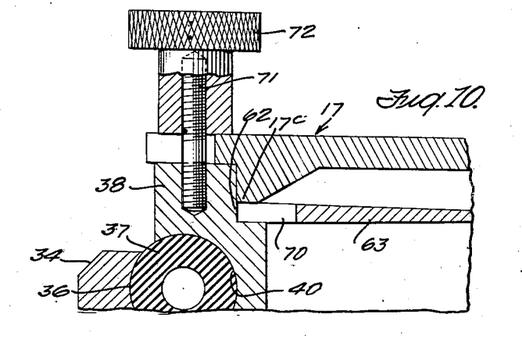
Figure 10 is a fragmentary sectional view on an enlarged scale showing part of the apparatus of Figure 1.

As above noted, there are some products whose particles are in effect sized and a further breaking up of which is undesirable; such particles, discharged tangentially from the peripheral discharge or outlet openings in the treating unit 10 and hence at points of maximum radius and of maximum peripheral velocities, might be broken up by striking the inside wall of the upper portion of the lower casing section 16, probably aided in their flight by the relatively high velocity of air discharged by the treating unit. Such undesirable effects I prefer to counteract or avoid in the following manner:

The upper thick walled portion 38 (Figure 1) of the casing section 16 I provide with a rabbet 62 (see also Figure 10) in which is seated, as by a push fit, an annular diaphragm member 63 which is preferably of tapered cross-section, terminating with a relatively sharp inner edge about and suitably spaced for clearance from the outer edge of the clamping member 55. Diaphragm member 63 thus in effect coacts with the clamping member 55, the clamping ring 58 and the downwardly projecting portion of the inlet flange 19 to block off, between them and in effect the upper casing section 17, an uppermost zone or space in the apparatus. This zone will be seen to be in effect annular and to it, at portions of lesser radius, I arrange to feed or supply air. This I may do by providing for the passage to it of some of the air that is recirculated, as above described.

For example, I may provide passages leading to this blocked off zone from the channels 56 in the upright members 51 and into which air is impelled by the bucket-like elements 46—47, and for this purpose the clamping ring 58 is provided with a suitable number of vertical apertures or passages 64 (Figure 3) suitably distributed about a circle of the same diameter as the circle about which the channels 56 are distributed; these passages 64 preferably incline away from the direction of rotation, as indicated in Figure 3, so that discharge of air therefrom is aided by the rotary motion and at their lower ends they communicate with the relatively deep annular groove in the ring 58, that groove being in turn in communication with the upper ends of the channels 56. Thus, if there are eight channels 56 and the ring is provided with eight apertures or channels 64, the latter need not be respectively alined with the channels 56, as may or may not be the case depending upon the extent to which the ring member 58 is rotated to effect the desired clamping of the assembly as above described. Thus, during the operation of the apparatus air may be fed or supplied to the inner part of the blocked off zone. Some of that air passes inwardly toward the inner flange 19, being forced or drawn through the small clearance gap between the latter and the adjacent edge of the clamping ring 58, thus preventing egress therethrough of untreated product or of forms of insect life. The inner face of the ring 58 is preferably inclined at a suitable angle, as indicated in Figures 1 and 2, so that product particles like flour cannot adhere to it or become deposited thereon.

The major portion of such air, however, moves downwardly and outwardly. To effect this latter movement, the upper face of the rotating member 55, being of increasing radius, may take part, but preferably the member 55 is provided with an air impeller element which may take the form of an annular plate-like member 66 preferably of tapering cross-section, as shown in Figures 1 and 2; member 66 may be secured to the member 55 in any suitable way, as by welding, and it is channeled or apertured as at 67, adjacent its connection to the member 55, to permit air moving in the space between the member 55 and a frustoconical portion 17ᵃ of the upper casing section 17 to be supplied also to the under side of the impeller element 66; this space, being of increasing radius and with the velocity of air flow therethrough increasing, is preferably of diminishing cross-section in the direction of air flow, as indicated in Figures 1 and 2.

Impeller element 66 extends about one-third or one-half of the radial extent of the annular space between the diaphragm member 63 and the parallel or horizontal portion 17ᵇ of the upper casing section 17, being in a vertical sense equidistantly spaced from the two faces of these parts.

Impeller element 66, acting through its upper and lower faces, as viewed in Figures 1 and 2, impels or discharges the air tangentially, at relatively high velocity, into the annular space which acts as a diffusion chamber, in effect converting the velocity energy of the discharged air to a pressure head effective to flow the air in a general downward direction through passages 70 in the diaphragm member 63 and distributed about the latter adjacent the upper end of the inside wall of the casing section 16.

Figure 6:
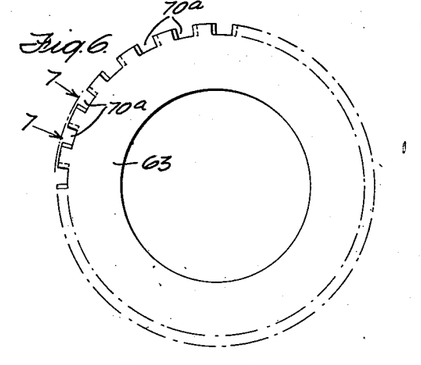
Figure 6 is a plan view on a smaller scale of a diaphragm element shown in section in Figures 1 and 2.
Figure 7:
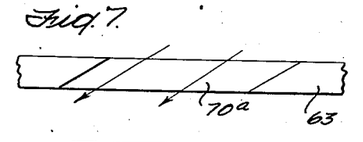
Figure 7 is a fragmentary elevation on a larger scale, as seen along the line 7—7 of Figure 6.
Figure 8:
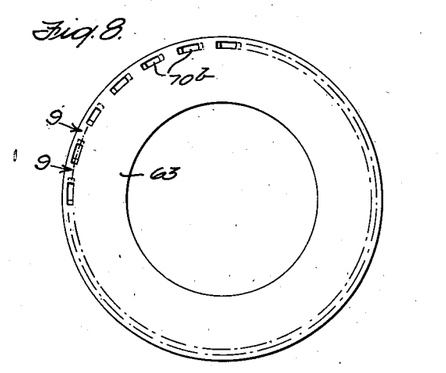
Figure 8 is a view like that of Figure 6 showing a modified form of diaphragm element.
Figure 9:
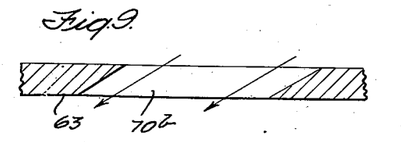
Figure 9 is a fragmentary sectional view on an enlarged scale as seen along the line 9—9 of Figure 8.

These passages 70 in the diaphragm member 63 may be formed, for example, as shown in Figure 6, where the member 63 is cut or milled at intervals as at 70ᵃ about its periphery, giving it a toothed-like effect, or the apertures may be otherwise formed, as by broaching, as indicated at 70ᵇ in Figure 8. Preferably, and as shown in Figures 7 and 9, the end walls of the apertures are inclined downwardly and opposed to the direction of rotation of the treating unit, thus giving the streams of air, which pass downwardly through the passages 70, a directional effect or component which, when considered in a view like that of Figure 3, is clockwise where the direction of rotation of the treating unit is counter-clockwise.

Where the member 63 is constructed as in Figure 6, the outer or end parts of the toothed-like members intervening the slots 70ᵃ rest in the rabbet 62 (see also Figure 10) which is deep enough also to take a downwardly extending circular rib or flange 17ᶜ of the upper casing section 17 which, with the conduit flange 19, is thus centered with the rest of the apparatus. Assembly of the parts may be insured as by threaded studs 71 projecting upwardly from the casing part 38 and accommodated in slots or apertures in the peripheral flange portion of the upper casing section 17 to effect clamping of the latter as by nuts 72. Where the member 63 is constructed as in Figure 8, the peripheral marginal portion rests in the rabbet 62 and the rib 17ᶜ takes over it. In either case, the passages 70, as is better shown in Figure 1, are thus preferably positioned close to the wall of the casing section 16 and being relatively numerous and uniformly distributed about the circumferential extent of the member 63, the correspondingly numerous streams of air forced downwardly therethrough, and preferably, with the above-mentioned directional effect, form in effect a cushion-like guard against product particles becoming broken up.

Thus, for example, a product particle discharged tangentially at high velocity from the treating unit leaves the latter in a path which, if continued, would lead it into impact with the wall of the casing structure. As it continues along its path, affected somewhat by gravity as to direction, giving it a movement along a twisted curve having helical and spiral components, the particle meets the downwardly and in a sense helically moving curtain of air formed by the streams coming down through the passages 70, the helical component being in a direction opposite that of the helical component of movement of the particle. The particle is thus slowed up in its movement; if it gets through the curtain-like air stream and strikes the upper part of the casing section 16, it does so with so little kinetic energy that it is not further broken up, while, on the other hand, it may have its energy of motion so dissipated or its direction of movement so changed that it simply passes downwardly in the annular space between the casing section 16 and the guard member 60 for discharge through the discharge passage 21.

The air impelling action of element 66 may thus also aid in the recirculating action in which impeller buckets 46—47 take part.

With the rotary treating unit rigidly mounted, as by the brackets 25, 26 and 27, or secured to the casing structure 16, precession, in the event that an unbalance occurs in the treating unit, may take place by the action of the resilient member 37 which forms a resilient connection between the casing structure and the supporting frame 34, the resilient connection falling in a plane which is at or slightly above the center of gravity of the rotating parts. When unbalance takes place, the yieldability of the resilient member 37 permits such a shifting of the apparatus as corresponds to a precessional motion, the resilient mounting permitting the rotating members and the load to assume, as a center of a gyration, the center of gravity of the rotating mass and its load. The resilient member opposes and ultimately negatives the forces that bring about the precessional motion and thus undue vibration or straining of the parts is avoided. By this preferred mounting the diaphragm member 63, the lower end of the inlet flange 19 and the guide member 60 partake of the precessional motion of the rotating mass and thus the clearances between the just-stated parts and their immediately coacting or adjacent rotating elements, such as the clamping member 55, the clamping ring 58, and the portion $60^b$ of the guide 60, respectively, may be made relatively small and the various coactions between these parts made more efficient.

Thus, it will be seen that there has been provided in this invention a method and apparatus in which the various objects above noted, together with many thoroughly practical advantages are successfully achieved. It will be seen that undesirable effects of an air-impelling action of the treating unit are dependably overcome and while, for illustrative purposes, I have abovementioned that the fraction of the air-impelling air capacity of the treating unit to be recirculated is on the order of 80%, it will be understood that by suitably proportioning various of the air-impelling parts, any desirable ratio may be achieved. It will also be seen that, where desired, breaking up of particles of the product to be treated is dependably avoided.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. An apparatus for destroying life of the insect infestation in a product comprising a casing-like structure having at its upper end an inlet passageway for the product and having in a lower portion thereof an exit passage therefor, product-treating means within said casing structure comprising rotary means having means mounting it for rotation about a vertical axis, said rotary means having product inlet means adjacent its axis for receiving product from said inlet passageway and having outlet means positioned at a greater radius than said inlet means, means for driving said rotary means to effect flow of the particles of the product with forms of insect infestation in a direction from said inlet means to said outlet means, there being intervening said inlet and said outlet means, means for destroying the insect lift in the product, said rotary means having the characteristic of impelling air from said inlet means for discharge through said outlet means, said rotary means comprising a plurality of superimposed spaced elements of which the lowermost is a carrier member having means forming passages for the movement of air from the under side of the carrier member to said inlet means, and means rotatable with said carrier member for impelling air into said passages and to said inlet means.

2. In apparatus of the character described, in combination, a rotatable material-treating unit comprising a carrier member having means for rotatably supporting it, said carrier member supporting a plurality of annular plate-like members having means holding them in spaced relation to form treatment spaces therebetween which are peripherally open at the smaller diameter thereof to form inlet means and peripherally open at the larger diameter thereof to form outlet means, a plurality of members in spaced relation about the first-mentioned peripheries of said members and forming means for distributing infed particles of material to said inlet means, said members having channels exposed to said inlet means and said carrier member having passages therethrough respectively in communication with said channels in said members, and means carried by said carrier member and effective, upon rotation, to impel air through said passages and into said channels for entry into said inlet means.

3. In apparatus for effecting the destruction of all insect life in a flowable product composed of individual solid parts, the combination of, a rotary treating device having a treating surface against which the product and insect life engages during the treatment, means forming an inlet having a substantially unrestricted passageway to allow a substantially even stream of said product to flow freely to said rotary treating device, means to feed said product to said inlet so that it may flow through said treating device, means to rotate said treating device at a high speed to provide a life destroying engagement between every individual particle of said insect life and said treating surface during passage of said product through said treating device, means forming a product outlet extending substantially around said treating device through which the product falls away from said treating device, and means for interposing in the path of the product particles as they leave said treating device an air stream to diminish their velocity thereby to prevent disintegration of the individual solid parts of the product from impact against other portions of the apparatus.

4. Apparatus as claimed in claim 3, in which said last-mentioned means comprises an air impeller associated with said treating device and rotated thereby.

5. Apparatus as claimed in claim 3, wherein means are provided for feeding air back to said inlet from a point adjacent the discharge end of said treating device.

6. In apparatus for effecting the destruction of all insect life in a flowable product composed of individual solid parts, the combination of, product directing means to receive the product and to direct the product along a path which extends to a treatment area through which the product flows freely, rotary treating means effective within said treatment zone to contact each particle of insect life within the product to impart lethal trauma to all of said insect life, means forming a casing surrounding said treating means and spaced therefrom to provide an annular channel into which the product is discharged subsequent to treatment by the rotary treating means, and means for directing a flow of air into said channel and at an angle to the direction of flow of the product to lessen the velocity of the solid parts of the product thereby to prevent disintegration thereof upon impact with the casing.

7. Apparatus as claimed in claim 6, in which said last-mentioned means comprises an air impeller fastened to and accordingly rotatable with said rotary treating device.

8. Apparatus as claimed in claim 6, in which said last-mentioned means includes a rotatable air impeller and means forming a driving connection between said rotary treating device and impeller, whereby said impeller is rotated upon rotation of the rotary treating device.

9. In apparatus for effecting the destruction of all insect life in a flowable product composed of individual solid parts, the combination of, product directing means to receive the product and to direct the product along a path which extends to a treatment zone through which the product flows freely, rotary treating means effective within said treatment zone to contact each particle of insect life within the product to impart lethal trauma to all of said insect life, means forming a casing surrounding said treating means, the walls of said casing being spaced from the discharge end of said rotary treating device to form an annular space into which the product is discharged by said treating device, means for introducing into said space a stream of air to diminish the velocity of the solid parts of the product as they leave the treating device, means forming a product outlet through which the product is discharged subsequent to treatment, and means for recirculating said air from a point adjacent said outlet to a point adjacent said product directing means.

10. In apparatus of the character described in combination, a material-treating unit comprising a rotatably supported carrier plate, an annular plate member mounted upon said plate and axially spaced therefrom, the central opening in said plate member forming an entrance for the material to be treated, and a plurality of hollow members circumferentially spaced about the inner edge of said plate member and spanning the space between said plate member and said plate, said hollow members being connected to holes in said plate and constructed to provide passageways from the outside of the carrier plate to the outside of the plate member.

11. Apparatus as claimed in claim 10 in which there is a casing surrounding said material-feeding unit and spaced therefrom together with means for directing air along said casing from one side of the treating unit to the other.

FRANKLIN S. SMITH.